J. W. SQUIRES.
CULTIVATOR.
APPLICATION FILED SEPT. 23, 1912.
1,059,498.
Patented Apr. 22, 1913.
2 SHEETS—SHEET 1.
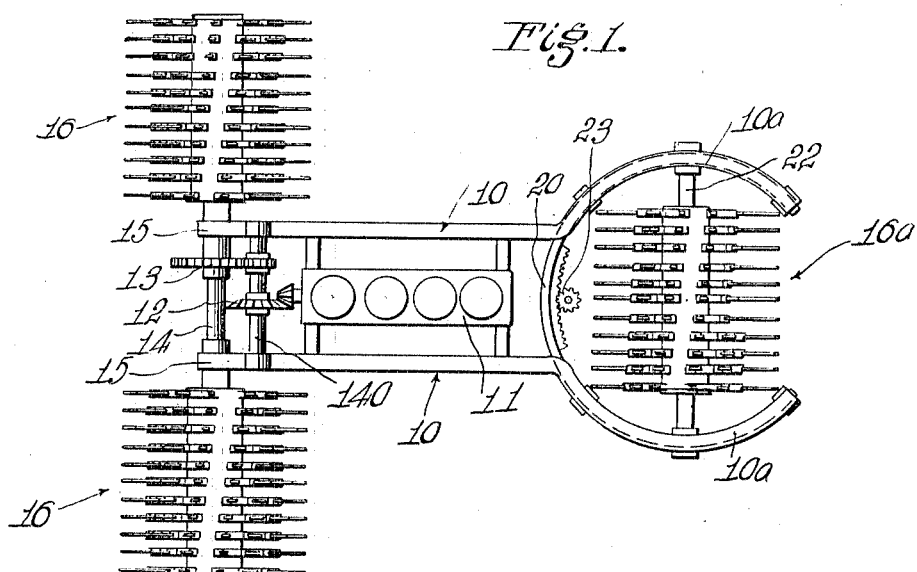
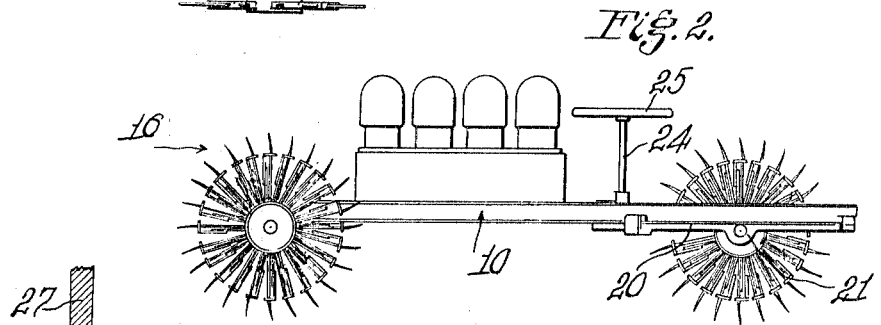
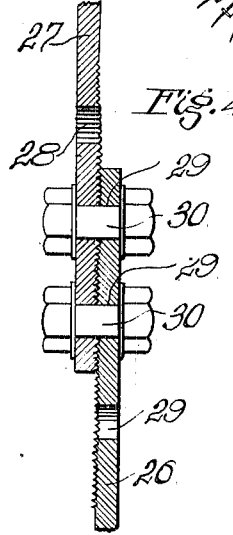
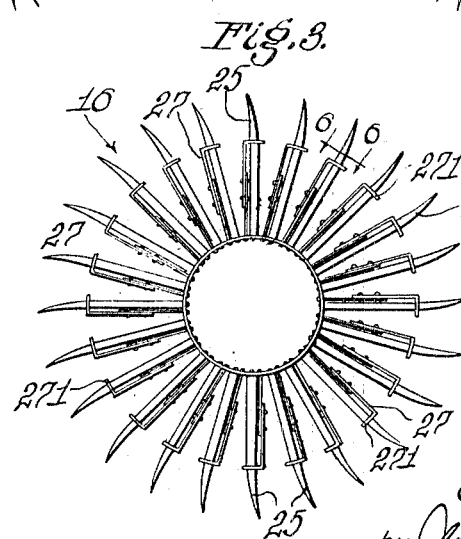
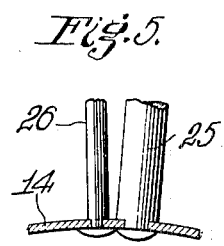
Inventor,
John W. Squires, J. W. SQUIRES.
CULTIVATOR.
APPLICATION FILED SEPT. 23, 1912.
1,059,498.
Patented Apr. 22, 1913.
2 SHEETS—SHEET 2.
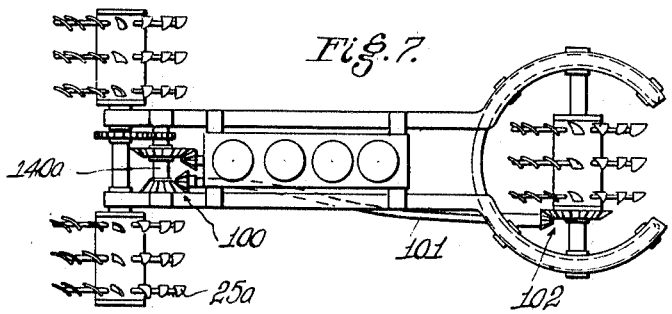
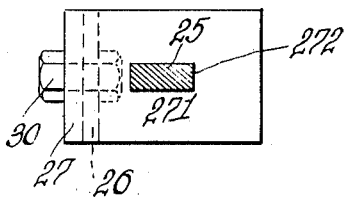
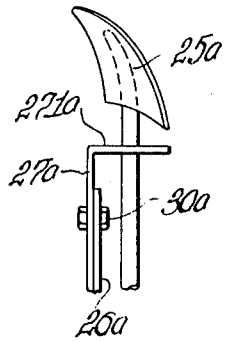
Witnesses.
Inventor
John W. Squires
by *his Attorney.*

UNITED STATES PATENT OFFICE.

JOHN W. SQUIRES, OF STOCKTON, CALIFORNIA.

CULTIVATOR.

1,059,498.   Specification of Letters Patent.   Patented Apr. 22, 1913.

Application filed September 23, 1912. Serial No. 721,797.

*To all whom it may concern:*

Be it known that I, JOHN W. SQUIRES, a citizen of the United States, residing at Stockton, in the county of San Joaquin, State of California, have invented new and useful Improvements in Cultivators, of which the following is a specification.

This invention relates to power wheeled or rotating cultivators for disturbing soil, turning furrows and the like; and has more particularly to do with the combination of a wheeled cultivator and power application and with an improved and novel form of cultivating wheel composed of radially extending cultivating teeth adapted to sink into and disturb the soil passed over.

One of the features of the present showing is the provision made for having none but cultivating wheels or rollers and having all of these positively driven by power. Each rolling cultivating element thus has no exterior impediment—that is, there is no force tending to prevent the forward movement of the element excepting the forces resisting the soil disturbance. Each element thus becomes independent so far as its soil disturbing action is concerned.

Another particular feature of my invention as now presented consists in my peculiar construction of the furrowing or disturbing element, wheel or equivalent devices. This element is preferably made up of a central shaft and a plurality of radially extending disturbing teeth, and adjustable tooth guards presenting flat faces around the teeth facing outwardly from the shaft, these faces being adapted to successively engage with the soil surface and to more or less limit the depth of which the teeth will sink into the soil. These features I am showing in the device explained in detail in the following specification and illustrated in the accompanying drawings, in which:

Figure 1 is a plan view of a cultivator embodying my invention. Fig. 2 is a side elevation of the same. Fig. 3 is an enlarged side elevation of a cultivating element wheel. Fig. 4 is a detail showing the adjustments of the tooth guards. Fig. 5 is a detail showing a possible form of construction of fastening the teeth and guards to the central shaft. Fig. 6 is an enlarged detail section taken as indicated by line 6—6 of Fig. 3. Fig. 7 is a plan view of a modified form of cultivator, showing all the cultivating elements positively driven. Fig. 8 is a detail of a modified form of soil disturbing tooth.

In the drawings 10 designates a suitable frame which may carry motive power 11, preferably in the form of an internal combustion engine, the engine being connected through shaft 140 and gears 12 and 13 with shaft 14 carried in bearings 15 on frame 10. Shaft 14 is extended on each side of the frame and carries at each side a cultivating element 16 of the form illustrated in the drawings. At the other end of frame 10, the frame members are curved outwardly as illustrated at 10ª, and a suitable sector 20 is carried beneath the portions 10ª, the sector 20 having bearings 21 in which shaft 22 of the furrow disturbing elements 16ª is mounted. Sector 20 may be rotated through the medium of a gear 23 mounted on the lower end of steering post 24 which has a steering wheel 25 at its upper end.

In Figs. 7 and 8 I have shown a modified form of device carrying teeth 25ª of such conformation and so spaced apart as to furrow the soil passed over. These, and other forms of teeth, may be used as occasion demands. I have also shown here the positive driving of each of the soil disturbing elements. The steering element may be driven through gearing 100, flexible shaft 101 and gearing 102, the gearing 102 being mounted on and to turn with the sector 20. This or any other suitable power connection may be used.

Each of the furrowing or disturbing elements is preferably made up as is illustrated best in Figs. 3 and 8. The shaft 14 may be hollow and of any desired size. This shaft 14 carries a plurality of radially extending furrow disturbing teeth 25 which may be of any configuration on their soil disturbing ends. The teeth 25 may be secured to the shaft 14 in the manner shown in Fig. 5, or in any suitable manner. The teeth are preferably secured to the shaft so as to be relatively in the position shown in Figs. 1 and 3, the rows of teeth being at a slight angle to the axis of the shaft so that some of the teeth will always be fully engaging the soil and so that the rolling of the soil disturbing elements over the soil may be smooth and easy. Each soil disturbing tooth is provided with a tooth guard, a device which prevents the teeth from sinking excessively into the soil. These guards are preferably adjustable, being preferably constructed as is shown in Figs. 3, 4 and 5. Each guard consists of an inner member 26, secured to the shaft 14 in some such manner as is shown in Fig. 5, and an outer member 27. The outer member 27 is provided at its inner end with an aperture 28 while the inner member is provided at its outer end with an aperture 29. Bolts 30 pass through the apertures and hold the members 26 and 27 in any desired relative position. The outer end of member 27 is bent, as shown at 271, so as to present an outwardly facing soil engaging surface. The portions 271 are provided with apertures 272 through which the teeth 25 project; and the portions 271 become in the nature of adjustable teeth surrounding the soil engaging teeth to adjustably limit the penetration of the teeth into the soil.

I conceive it to be advantageous to have each traction and cultivating element complete in itself—applying its own power directly to soil disturbance—and also advantageous to have each element of such a combination as described positively driven. This is one of the features I wish to secure in the following claims. Each element should be preferably similar to each of the others so as to disturb the soil in the same manner and expend the same amount of energy; and each element should then be supplied with the same amount of energy from the motive power source. This insures the balance of the system by precluding the possibility of one element requiring more energy than the others and of thus becoming a drag which the others must pull.

Having described my invention, I claim:

1. A cultivator, comprising a frame, a plurality of rolling traction and soil disturbing elements forming the sole support for said frame, each element comprising a central shaft, a plurality of soil disturbing teeth projecting radially therefrom, and tooth guards presenting flat faces outwardly from the shaft and adapted to engage the soil surface, said tooth guards being adjustable to and from the shaft along the teeth, a power plant on said frame, and means applying power from the power plant to rotate each of the elements.

2. A cultivator, comprising a frame, a plurality of rolling traction and soil disturbing elements forming the sole support for said frame, each element comprising a central shaft, a plurality of soil disturbing teeth projecting radially therefrom, and tooth guards presenting flat faces outwardly from the shaft and adapted to engage the soil surface, said guards comprising members extending radially from the shaft, other members adjustably attached to said first mentioned members, and soil engaging portions on said last named members surrounding the soil disturbing teeth and presenting flat surfaces outwardly from the shaft to engage the soil surface, a power plant on said frame, and means applying power from the power plant to rotate each of the elements.

3. A cultivator, comprising a frame, a plurality of rolling traction and soil disturbing elements forming the sole support for said frame, each element comprising a central shaft, a plurality of soil disturbing teeth projecting radially therefrom, and tooth guards each comprising a radially extending bar affixed to the shaft, another bar overlapping the first mentioned bar and extending farther from the shaft, the outer end of the second mentioned bar being bent approximately at right angles to present a flat face to the soil surface, the bent end portion having an aperture through which a tooth projects, and adjustable bolt and slot connection between the two bars for adjusting the outer bar and its soil engaging surface to and from the central shaft, a power plant on said frame, and means applying power from the power plant to rotate each of the elements.

In witness that I claim the foregoing I have hereunto subscribed my name this 31st day of August 1912.

JOHN W. SQUIRES.

Witnesses:
    F. A. RANEY,
    C. E. KAY.